(12) United States Patent
 Thompson

(10) Patent No.: US 10,145,476 B2
(45) Date of Patent: *Dec. 4, 2018

(54) PINCH VALVE SYSTEMS AND METHODS

(71) Applicant: Resolution Air Ltd., Cincinnati, OH (US)

(72) Inventor: Bradley Richard Thompson, Cincinnati, OH (US)

(73) Assignee: Resolution Air Ltd., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,006

(22) Filed: Sep. 26, 2017

(65) Prior Publication Data

US 2018/0017169 A1  Jan. 18, 2018

Related U.S. Application Data

(63) Continuation of application No. 14/959,423, filed on Dec. 4, 2015, now Pat. No. 9,803,754.

(60) Provisional application No. 62/087,349, filed on Dec. 4, 2014.

(51) Int. Cl.
| | |
|---|---|
| *F16K 7/04* | (2006.01) |
| *F16K 1/02* | (2006.01) |
| *F16K 31/06* | (2006.01) |
| *F16K 37/00* | (2006.01) |
| *F16K 7/06* | (2006.01) |

(52) U.S. Cl.
CPC ............... *F16K 1/02* (2013.01); *F16K 7/06* (2013.01); *F16K 31/0655* (2013.01); *F16K 37/0033* (2013.01)

(58) Field of Classification Search
CPC .......... F16K 37/0033; F16K 7/06; F16K 1/02; F16K 31/0655
See application file for complete search history.

(56) References Cited

U.S. PATENT DOCUMENTS

| | | | | |
|---|---|---|---|---|
| 3,826,461 A | * | 7/1974 | Summerfield | F16K 7/123 251/7 |
| 4,518,145 A | * | 5/1985 | Keltz | F16K 7/06 251/5 |
| 4,548,382 A | * | 10/1985 | Otting | F16K 7/06 137/625.65 |
| 4,596,374 A | * | 6/1986 | Thompson | A61M 39/28 251/129.11 |
| 4,694,861 A | * | 9/1987 | Goodale | F16K 7/045 137/595 |
| 4,706,207 A | * | 11/1987 | Hennessy | G01N 15/12 356/39 |

(Continued)

*Primary Examiner* — Umashankar Venkatesan
(74) *Attorney, Agent, or Firm* — Ulmer & Berne LLP

(57) ABSTRACT

Embodiments of a pinch valve assembly include a controller, where the controller is preprogrammed with a plurality of selectable modes including a step and direction mode, a flow monitoring mode, a flow and fill mode, and an unclog mode, and an actuator assembly, the actuator assembly being controlled by the controller, an actuator, the actuator being actuated by the actuator assembly, a piston, the piston being coupled with the actuator, a valve body, the valve body being coupled with the actuator assembly, and an aperture, the aperture being formed in the valve body, wherein the aperture is configured to retain at least a portion of tubing such that fluid or gas flow within the tubing can be metered.

19 Claims, 17 Drawing Sheets

(56) References Cited

U.S. PATENT DOCUMENTS

| | | | | |
|---|---|---|---|---|
| 4,800,920 A * | 1/1989 | Yusko, Jr. | F16K 7/07 137/556 |
| 5,326,033 A * | 7/1994 | Anfindsen | F16K 7/065 239/300 |
| 6,082,702 A * | 7/2000 | Campau | F16K 7/061 137/360 |
| 6,361,016 B1 * | 3/2002 | Schulz | F16K 7/06 251/4 |
| 7,104,275 B2 * | 9/2006 | Dille | F16K 7/045 137/486 |
| 8,337,380 B2 * | 12/2012 | Ellingboe | A61M 1/0209 251/7 |
| 8,544,815 B2 * | 10/2013 | Avery | A61M 5/16881 251/208 |
| 2002/0088954 A1 * | 7/2002 | Miller | F16K 7/045 251/7 |
| 2004/0112436 A1 * | 6/2004 | Dille | F16K 7/045 137/487.5 |
| 2005/0092308 A1 * | 5/2005 | Tsokonas | F02M 26/48 123/568.23 |
| 2006/0102091 A1 * | 5/2006 | Kissinger | A61B 5/1113 119/417 |
| 2007/0161970 A1 * | 7/2007 | Spohn | A61M 5/007 604/533 |
| 2010/0301245 A1 * | 12/2010 | Accurso | F16K 27/003 251/129.15 |
| 2011/0102845 A1 * | 5/2011 | Lapstun | B41J 2/17503 358/1.15 |
| 2012/0223262 A1 * | 9/2012 | Parker | F25B 41/062 251/129.11 |
| 2013/0331635 A1 * | 12/2013 | Hoffman | A61N 5/1007 600/5 |
| 2014/0077107 A1 * | 3/2014 | Berwanger | F16K 7/065 251/7 |
| 2014/0271252 A1 * | 9/2014 | Vines | F04B 49/22 417/53 |
| 2014/0299798 A1 * | 10/2014 | Opfer | F16K 31/1221 251/5 |

* cited by examiner

PINCH VALVE SYSTEMS AND METHODS

REFERENCE TO RELATED APPLICATION

This application is a continuation of U.S. non-provisional application Ser. No. 14/959,423, filed Dec. 4, 2015, which claims priority to U.S. provisional patent application Ser. No. 62/087,349, filed Dec. 4, 2014, which are hereby incorporated by reference in their entirety.

TECHNICAL FIELD

Embodiments of the technology relate, in general, to valve technology, and in particular to pinch valves that can meter the flow of fluid or gas through tubing using a stepper motor.

BACKGROUND

In liquid filling machines for dispensing predetermined quantities of liquid into containers, for example, valves are generally provided for controlling the flow of the liquids. These valves generally include a flexible hose or sleeve through which a fluid is conveyed. The flexible hose is pinched to reduce or stop the flow therethrough. Pinching of the hose may be accomplished by applying high pressure fluid about the outside of a portion of the hose, by mechanically compressing the hose, or by twisting the hose, etc. From the standpoint of reducing or eliminating contamination problems in liquid filling machines, pinch valves may be particularly advantageous in that the flexible hoses provide smooth and unobstructed passages for liquid flowing through the valve so as to avoid or minimize the additional surfaces, cracks or seams that could trap material.

BRIEF DESCRIPTION OF THE DRAWINGS

The present disclosure will be more readily understood from a detailed description of some example embodiments taken in conjunction with the following figures.

SUMMARY

Figure 1:
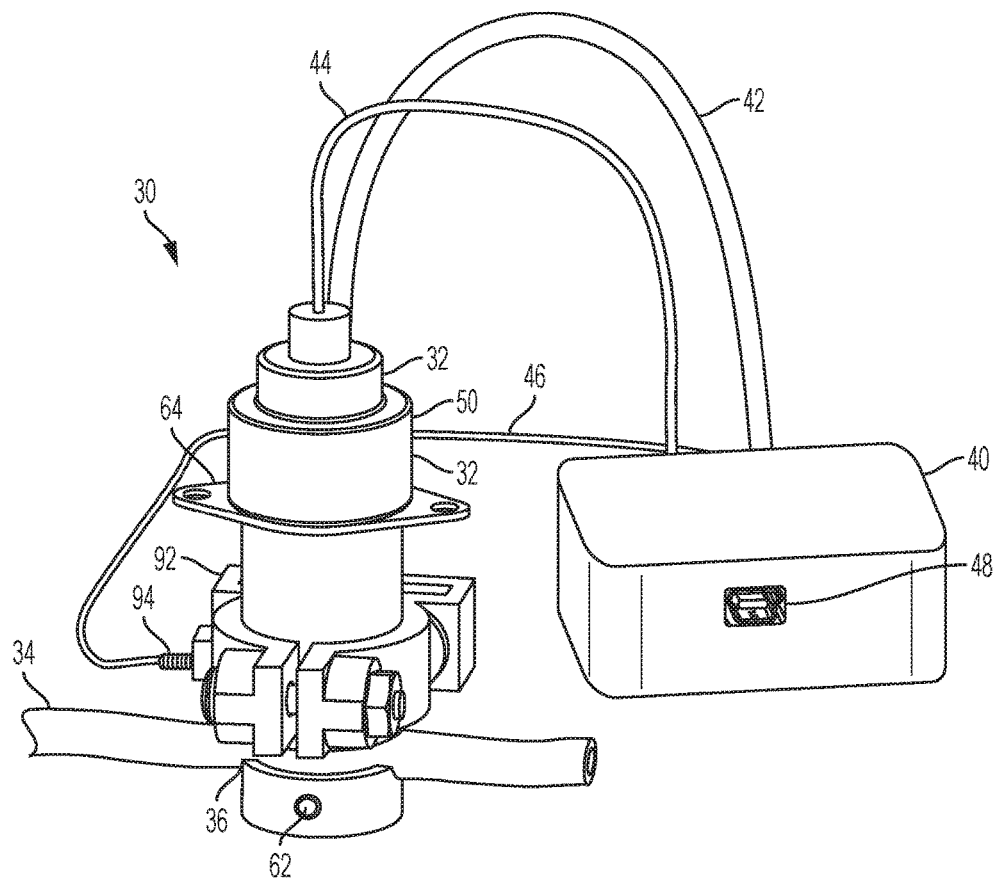
FIG. 1 depicts a perspective view of a pinch valve system having a pinch valve assembly, a hose positioned within the pinch valve assembly, a mounting bracket, a position sensor, a controller, and associated cables in accordance with versions described herein.
Figure 2:
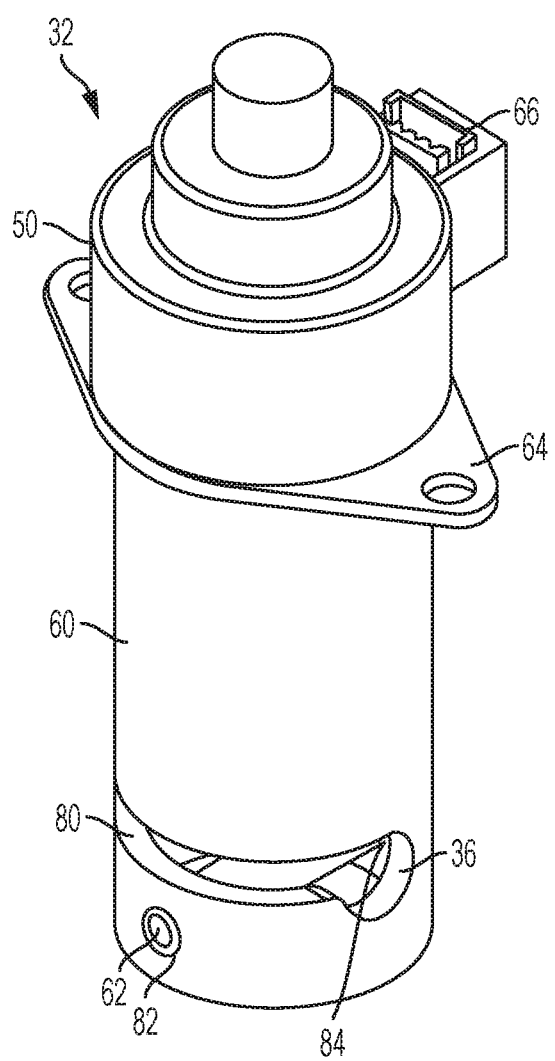
FIG. 2 depicts a perspective view of the pinch valve assembly shown in FIG. 1.

Embodiments can include a pinch valve assembly including a controller, an actuator assembly, the actuator assembly including a stepper motor, where the stepper motor is coupled to the controller such that the stepper motor is controlled by the controller, a leadscrew, the leadscrew being actuated by the stepper motor such that the leadscrew travels in a plurality of incremental linear steps in a first direction and a second direction, a piston, the piston being coupled with the leadscrew such that relative movement of the leadscrew is transferred to the piston, where the piston includes a projection, a valve body, the valve body being coupled with the actuator assembly, where the piston travels in the first direction and the second direction within a bore defined by the valve body, a slotted aperture, the slotted aperture being formed in the valve body and having a slotted portion and a substantially annular portion, where the substantially annular portion is configured to retain at least a portion of tubing, and a pin, the pin being inserted into the valve body, where the projection of the piston and the pin are configured to pinch tubing therebetween such that flow within the tubing can be metered.

Embodiments can include a pinch valve assembly including a controller, where the controller is preprogrammed with a plurality of selectable modes including a step and direction mode, a flow monitoring mode, a flow and fill mode, and an unclog mode. The pinch valve assembly includes an actuator assembly, the actuator assembly including a stepper motor, where the stepper motor is coupled to the controller such that the stepper motor is controlled by the controller, a leadscrew, the leadscrew being actuated by the stepper motor such that the leadscrew travels in a plurality of incremental linear steps in a first direction and a second direction in response to the plurality of selectable modes, a piston, the piston being coupled with the leadscrew such that relative movement of the leadscrew is transferred to the piston, a valve body, the valve body being coupled with the actuator assembly, where the piston travels in the first direction and the second direction within a bore defined by the valve body, and an aperture, the aperture being formed in the valve body, where the aperture is configured to retain at least a portion of tubing such that fluid or gas flow within the tubing can be metered.

Embodiments of a pinch valve assembly can include a controller, where the controller is preprogrammed with a plurality of selectable modes including a step and direction mode, a flow monitoring mode, a flow and fill mode, and an unclog mode. Embodiments can include an actuator assembly, the actuator assembly including a stepper motor, where the stepper motor is coupled to the controller such that the stepper motor is controlled by the controller, a leadscrew, the leadscrew being actuated by the stepper motor such that the leadscrew travels in a plurality of incremental linear steps of about 0.0005 inches in a first direction and a second direction, a piston, the piston being coupled with the leadscrew such that relative movement of the leadscrew is transferred to the piston, where the piston includes a projection, a cylindrical valve body, the cylindrical valve body being coupled with the actuator assembly, where the piston travels in the first direction and the second direction within a bore defined by the cylindrical valve body, a slotted aperture, the slotted aperture being formed in a lower portion of the cylindrical valve body and having a slotted portion and a substantially annular portion, where the substantially annular portion is configured to retain tubing, and a dowel pin, the dowel pin being inserted into the valve body, where the projection of the piston and the dowel pin cooperate to pinch the tubing therebetween such that flow within the tubing can be metered by the controller in accordance with the plurality of selectable modes.

DETAILED DESCRIPTION

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for pinch valve assemblies, systems, and methods. In one example embodiment, a pinch valve assembly can be controlled by a stepper motor and can include a piston that travels in 0.0005" incremental linear steps. Such a system can allow for extremely fine metering control of the fluid or gas passing through an associated tube or hosing. A piston associated with an actuator or leadscrew of the pinch valve assembly can be designed to compress the associated tubing and can be non-back drivable such that the piston only moves when it is energized. Electrical power may only be required to change piston position in one embodiment, which can be described as "fail in place". Such functionality can be beneficial in remote (i.e., off the grid) applications where automated flow control is desired or in critical applications where flow must not be affected by system power failure. Examples of industries where such a system may be useful include medical, water desalination, distilleries, breweries, food and beverage, laboratory equipment The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Referring now to the figures, FIG. 1 depicts one embodiment of a pinch valve system 30 that can include a pinch valve assembly 32, tubing 34 retained at least partially within a slotted aperture 36 defined by the pinch valve assembly 32, a mounting bracket 64, and a controller 40 that can be coupled to the pinch valve assembly 32 with a first cable 42, second cable 44, and third cable 46. The controller 40 can be programmed to control the pinch valve assembly 32 such that fluid or gas flow through the tubing 34 can be controlled in accordance with methods described herein. The pinch valve system 30 may improve the control over fluid flow in applications, such as medical applications, where precision is critical. The pinch valve system 30 can also be non-back drivable such that the tubing 34 can be compressed to a pre-determined level and retained at such a level even if power is lost. Such features may be useful in applications where constant fluid or gas control is desired, but where sources of power are limited or unreliable.

The pinch valve controller 40 can be accessed via any suitable technique, such as a web-browser such as SAFARI, OPERA, GOOGLE CHROME, INTERNET EXPLORER, or the like executing on a client device. In some embodiments, the systems and methods described herein can be a web-based application or a stand-alone executable. Any suitable client device can be used to access, execute, or act as a "primary controller" for the pinch valve controller 40, such as laptop computers, desktop computers, smart phones, tablet computers, and the like via port or access point 48, or any other suitable mechanism of communication.

In general, it will be apparent to one of ordinary skill in the art that at least some of the embodiments described herein can be implemented in many different embodiments of software, firmware, and/or hardware. The software and firmware code can be executed by the controller 40 or any other similar computing device. The software code or specialized control hardware that can be used to implement embodiments is not limiting. For example, embodiments described herein can be implemented using computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

The controller 40 can include any suitable processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signal.

It will be appreciated that the controller 40 can communicate with the pinch valve assembly 32 via one or a plurality of cables 42, 44, 46, or can be configured to wirelessly communicate with the pinch valve assembly 32. Wireless communication can occur, for example, over a local area network (LAN), BLUETOOTH, or by any other suitable mechanism.

Figure 3:
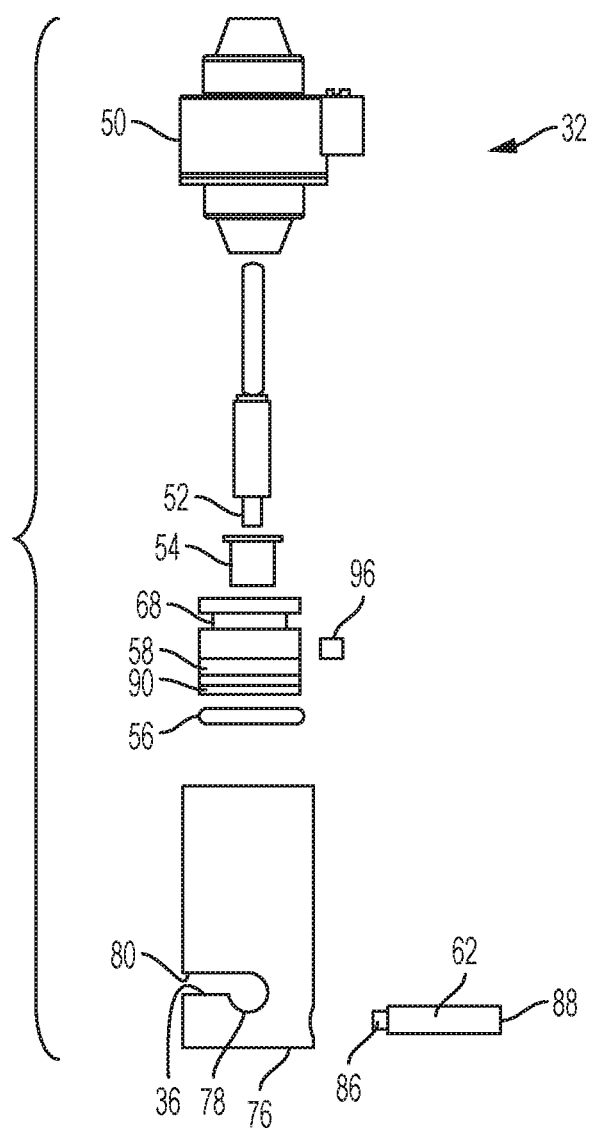
FIG. 3 depicts a right side exploded view of the pinch valve assembly shown in FIG. 1.
Figure 4:
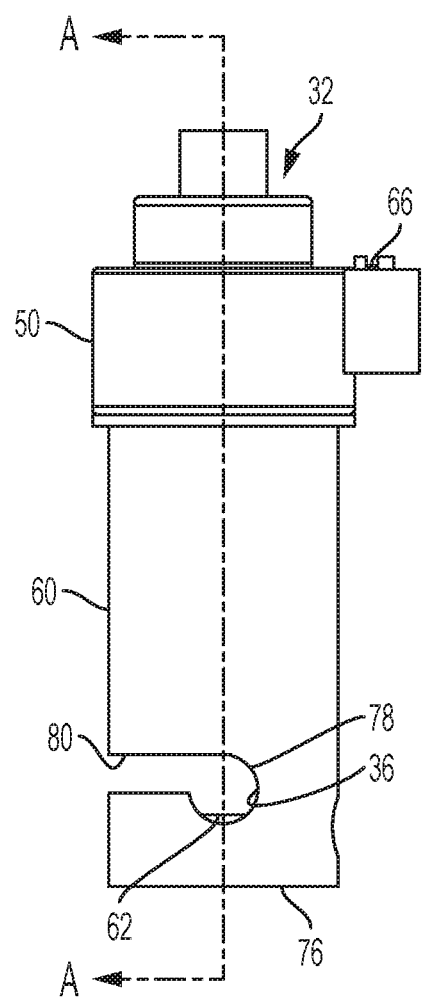
FIG. 4 depicts a right side view of the pinch valve assembly shown in FIG. 1.

Referring to FIGS. 2-6, one embodiment of the pinch valve assembly 32 is shown. Referring to FIG. 3, the pinch valve assembly 32 can include an actuator assembly 50 that can include a leadscrew 52, a piston adapter 54 that can be engaged with the leadscrew 52, an elastomeric seal 56, a piston 58, a valve body 60, and a dowel pin 62. The leadscrew 52 can be threaded into the piston adapter 54 in one embodiment. The actuator assembly 50 can include a bracket 64 that can be used to couple the pinch valve assembly 32 to any suitable structure. As shown in more detail with respect to FIG. 5, the actuator assembly 50 can include a linear actuator which can include a stepper motor with an integrated leadscrew. Providing the actuator assembly 50 with a stepper motor can allow for granular control over the positioning of the leadscrew and associated piston such that tubing positioned within the pinch valve assembly 32 can be compressed to adjust fluid or gas flow as desired. The actuator assembly 50 can include a port 66 that can be configured for attachment with the cable 42 for communication with the controller 40 such that the controller 40 can control the stepper motor and associated leadscrew, in one embodiment. It will be appreciated that the actuator assembly can include any suitable mechanism, including various linear actuators, in accordance with versions described herein. The use of servo linear actuators as well as piezo linear actuators are contemplated.

Referring to FIG. 3, the pinch valve assembly 32 can include a piston adapter 54 that can attach the leadscrew 52 to the piston 58. The piston 58 can include an annular channel 68 that can be sized to accommodate the elastomeric seal 56. The valve body 60 can be a tubular metal structure sized to receive the piston 58 such that the piston can travel within the bore 70 defined by the valve body 60. The piston 58 and elastomeric seal 56 can be sized to create a seal in cooperation with the valve body 60. It will be appreciated that any suitable structure or mechanism for translating the motion of the leadscrew 52 to the piston 58 is contemplated.

During assembly, the linear actuator 50 can be inserted into the bore 70 defined by the valve body 60 and can be secured via any suitable adhesive or with a mechanical fastener, for example. The leadscrew 52 of the linear actuator 50 can be threaded and can engage corresponding threading on the adapter 54 to facilitate coupling. The outside diameter 72 of the adapter 54 can be inserted into the counter bore 74 of the piston 58. Proximate the lower or bottom end 76 of the valve body 60, the valve body 60 can define a slotted aperture 36 that can be machined in the valve body 60. The slotted aperture 36 can include a substantially annular portion 78 that can retain tubing 34 (FIG. 1) and a lateral portion 80 that can be used to insert the tubing 34 into the annular portion 78 of the slotted aperture 36. The lateral portion 80 can have a width that is less than the diameter of the annular portion 78 such that the tubing 34 is easily retained within the annular portion 78. It will be appreciated that any configuration for the slotted aperture 36 is contemplated. It will be appreciated that the slotted aperture 36 can include a closure mechanism or other feature to retain the tubing within the aperture.

Figure 8:
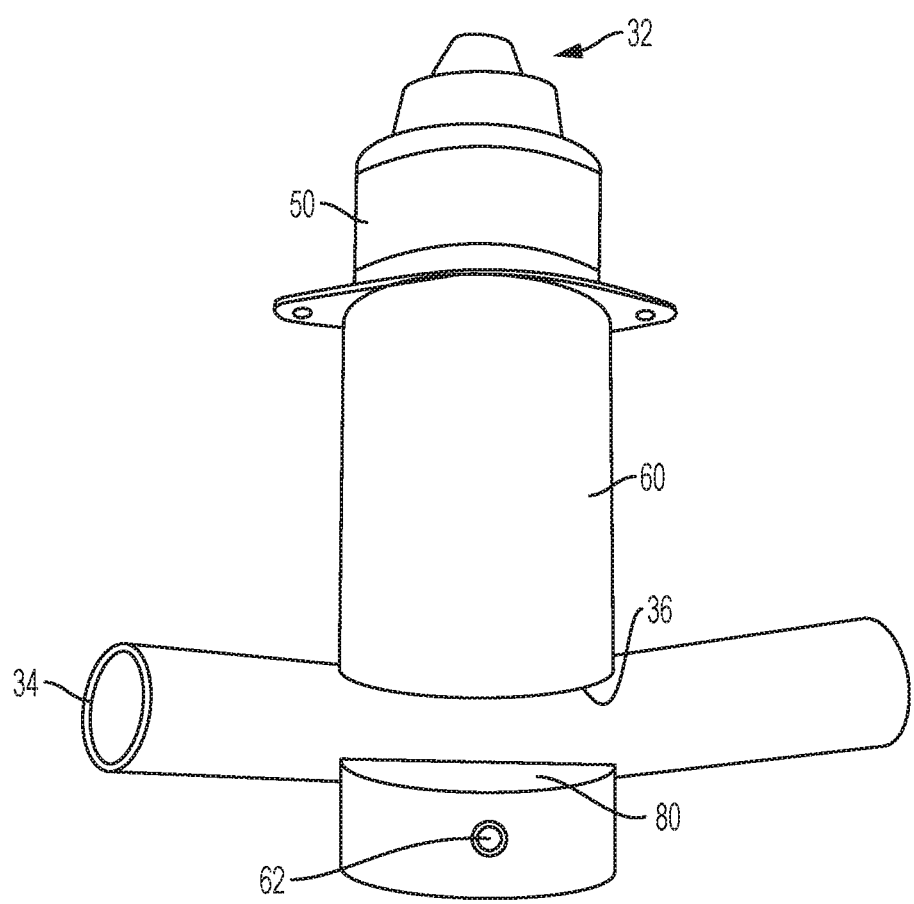
FIG. 8 depicts a front view of the pinch valve assembly and associated hose of FIG. 1 shown with a piston fully retracted such that the hose is not compressed.
Figure 9:
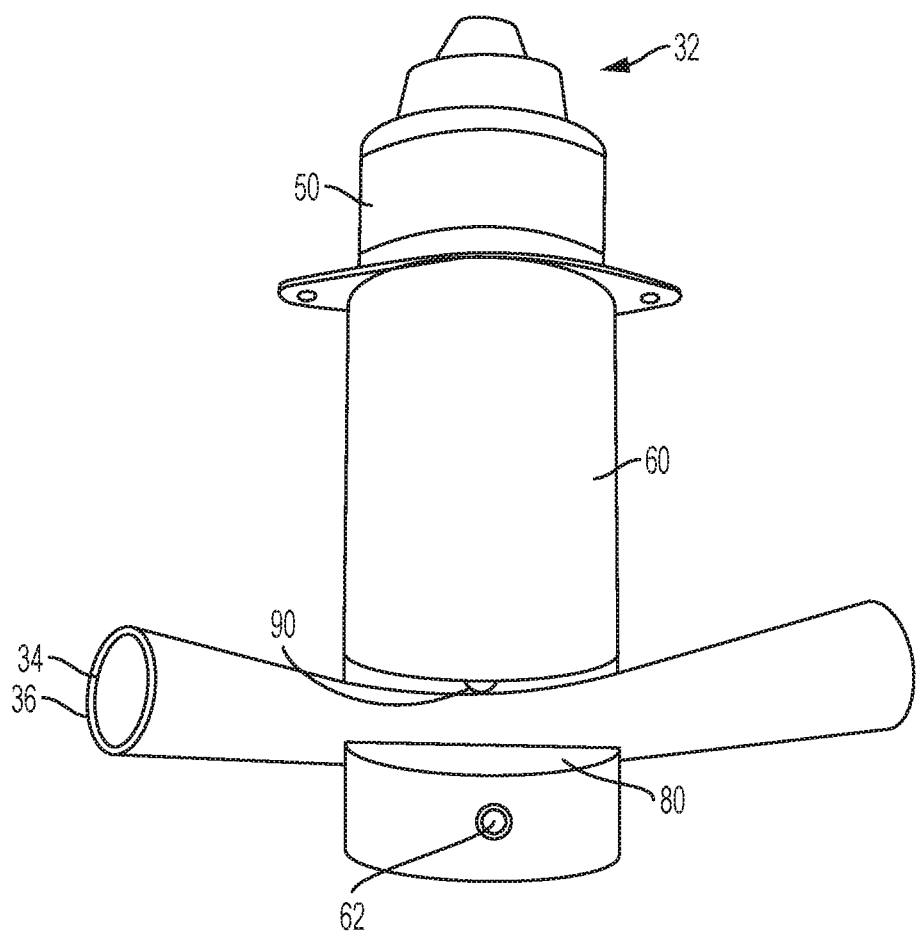
FIG. 9 depicts a front view of the pinch valve assembly and associated hose of FIG. 8 shown with the piston partially extended such that the hose is partially compressed.
Figure 10:
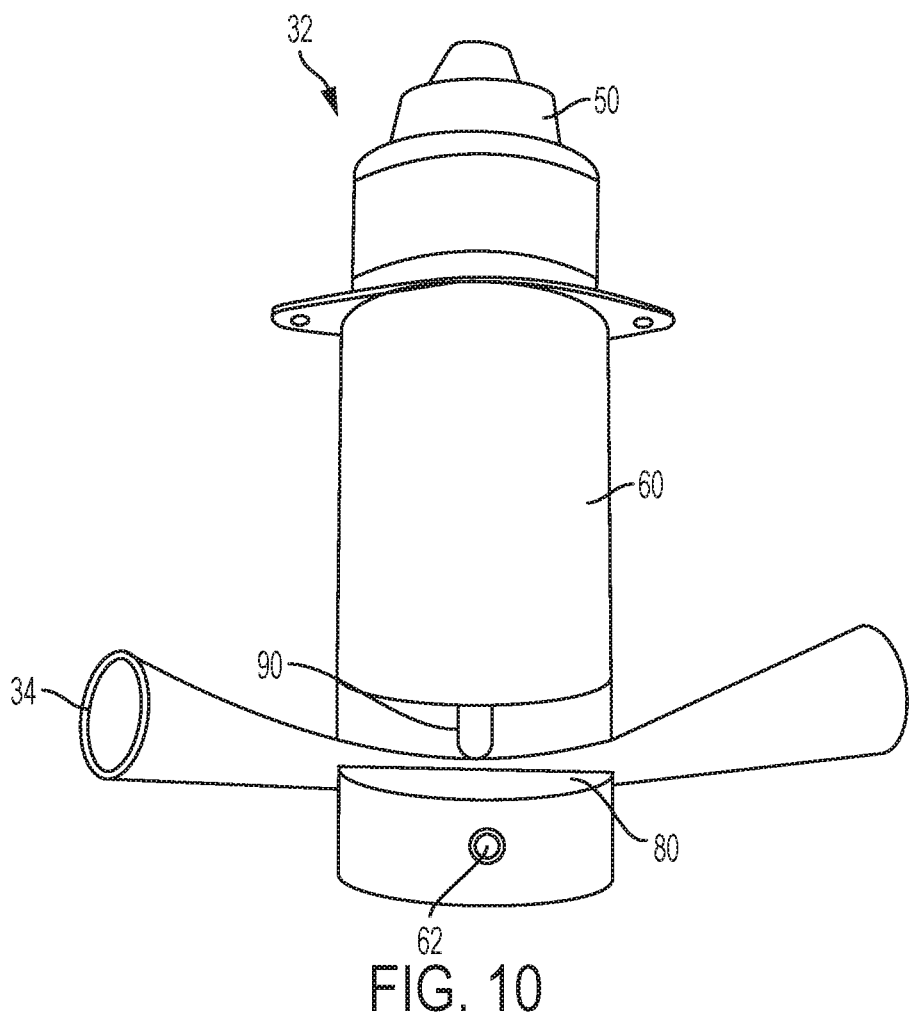
FIG. 10 depicts a front view of the pinch valve assembly and associated hose of FIG. 8 shown with the piston fully extended such that the hose is fully compressed.

The valve body 60 can further define a first pin aperture 82 (FIG. 2) and a second pin aperture 84 (FIG. 3) that can be sized to accept first end 86 and second end 88 of the dowel pin 62, respectively. When inserted, the dowel pin 62 can be substantially perpendicular to a central axis of the annular portion 78 of the slotted aperture 36. The first end 86 of the dowel pin 62 can have an outer diameter sized to mate with the first pin aperture 82 and the second end 88 of the dowel pin 62 can have an outer diameter sized to mate with the second pin aperture 84, where the first pin aperture 82 can have a smaller inner diameter than the second pin aperture 84. In this manner, the dowel pin 62 can be inserted through the second pin aperture 84 until the dowel pin engages and is stopped by the smaller diameter first pin aperture 82. The dowel pin 62 can have any suitable outer diameter and, in one embodiment, the outer diameter of the dowel pin 62 can be such that the outer diameter of the dowel pin 62 is substantially tangent the annular portion 78 of the slotted aperture 36. In this manner, when the tubing 34 is inserted into the annular portion 78 of the slotted aperture, the tubing can rest upon the outer diameter of the dowel pin 62. During operation, the piston 58 can compress the tubing 34 against the dowel pin 62 to restrict fluid or gas flow as shown in FIGS. 8-10. The dowel pin 62 can be fixedly coupled with the valve body 60, can be integral with the valve body 60, can be selectively removable from the valve body 60, and can have any suitable shape or configuration in accordance with versions described herein. In one version, differently sized and/or shaped pins can be selectively engaged with the same valve body such that different pins can be associated with different tubing used with the pinch valve assembly 30.

Referring to FIGS. 7A-7D, a plurality of pinch valve assemblies 32 are show illustrating that any suitable sizing of the slotted aperture 36 is contemplated. For example, the diameter of the annular portion 78 can be about 0.125 inches, about 0.250 inches, about 0.375 inches, about 0.500 inches, from about 0.100 inches to about 1.0 inches, from about 0.250 to about 0.750 inches, or any other suitable dimension. The pinch valve assemblies 32 can have any suitable length such as for example, about 1.0 inches, about 2.0 inches, about 3.310 inches, from about 1.0 inches to about 5.0 inches, from about 1.5 inches to about 3.5 inches, or any suitable dimension.

Figure 11:
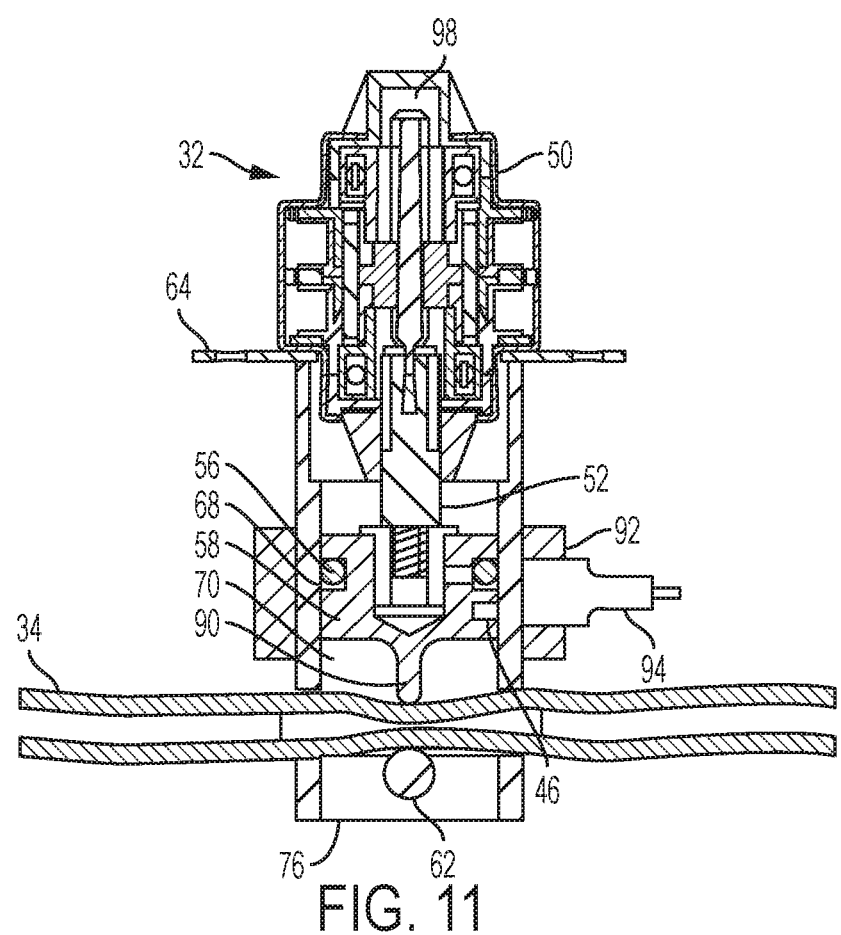
FIG. 11 depicts a front cross-sectional view of the pinch valve assembly shown in FIG. 5 in combination with a position sensor such that the pinch valve assembly can ascertain the position of an associated piston within the valve body.

Referring to FIGS. 1 and 11, the pinch valve assembly 32, in one embodiment, can include a sensor bracket 92 that can be coupled to the valve body 60 as shown in FIG. 1. The sensor bracket 92 can include an adjustable position sensor 94 that can communicate with the controller 40 via cable 46. As shown in FIG. 11, the piston can include a piston magnet 96, for example a rare earth piston magnet, such that relative movement of the piston magnet 96 can indicate via the position sensor 92 where the piston 58 is positioned relative to the valve body 60. Feedback regarding the position of the piston 58 can be communicated in a loop back to the controller 40 such that adjustments can be made via the actuator assembly 50 as appropriate to maintain the proper flow through the tubing 34 (FIG. 9, for example). Providing a feedback loop such as that shown in FIGS. 1 and 11 can allow the controller 40 to automatically adjust to maintain desired flow characteristics as different pistons or replacement pistons are inserted or engaged with the valve assembly 32.

Figure 12:
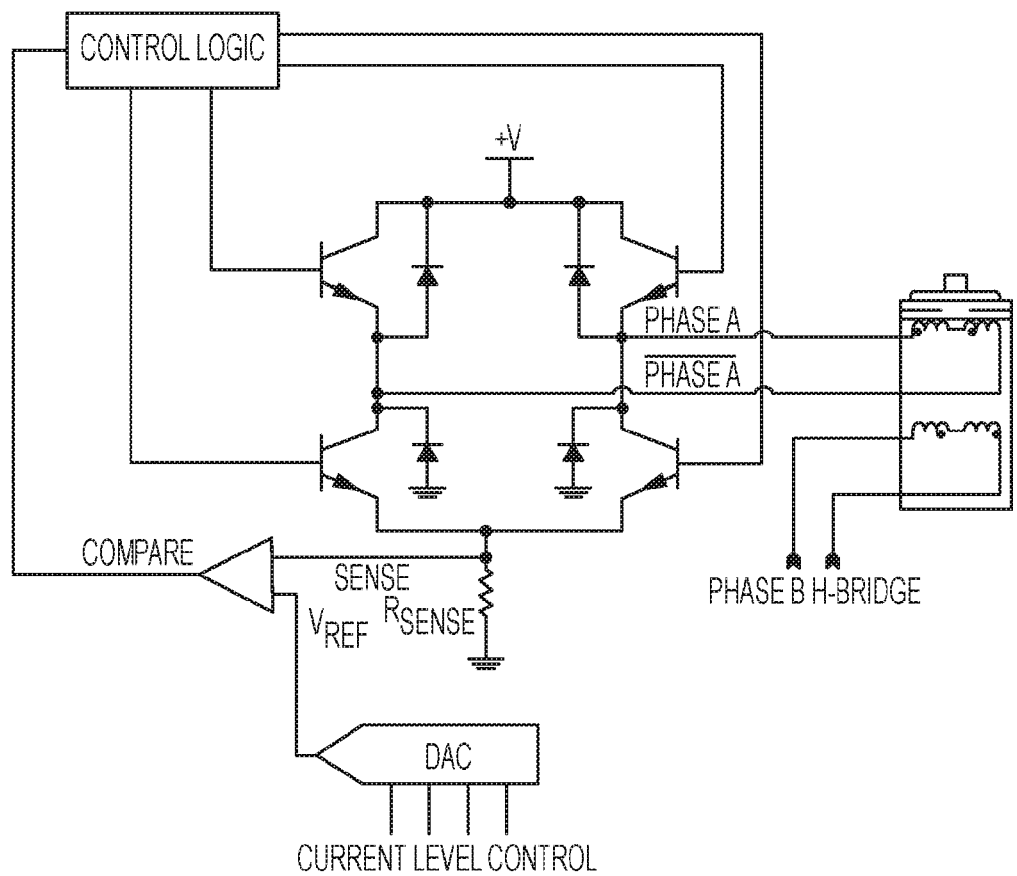
FIG. 12 depicts a schematic of a stepper motor controlled via a bi-polar chopper drive according to one embodiment.

Referring to FIG. 12, the actuator assembly 50 and/or stepper motor can be controlled via a bi-polar chopper drive as illustrated schematically. The controller 40 can have a programmable and non-programmable mode, for example. Functioning in the non-programmable mode, the valve assembly 32 can behave like a standard bi-polar stepper drive. In the programmable mode, the operator can connect the controller 40 to a computer or network and can adjust the pinch valve assembly 32 operating parameters based upon flow requirements for a specific task. When this is complete, the controller 40 can then be disconnected from the external computer or client device for operation.

Figure 5:
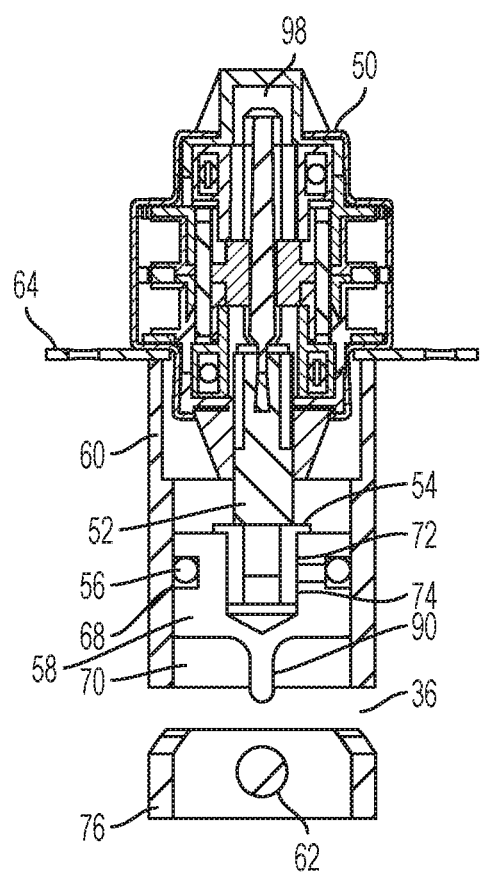
FIG. 5 depicts a cross-sectional view of the pinch valve assembly of FIG. 4 taken along reference line A-A in accordance with versions described herein.
Figure 6:
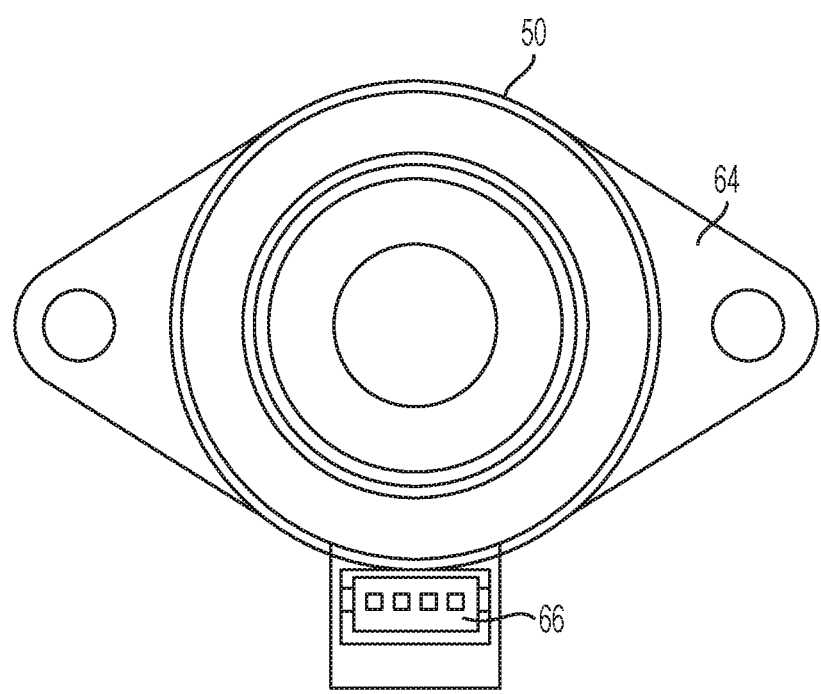
FIG. 6 depicts a top view of the pinch valve assembly shown in FIG. 1.
Figures 7A, 7B, 7C, 7D:
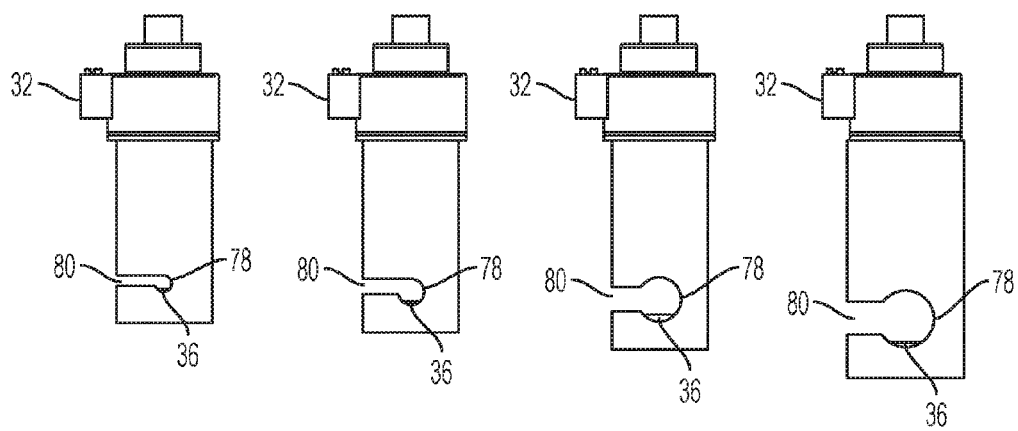
FIGS. 7A-7D depict a right side view of a plurality of differently sized pinch valve assemblies in accordance with versions described herein.
Figure 13:
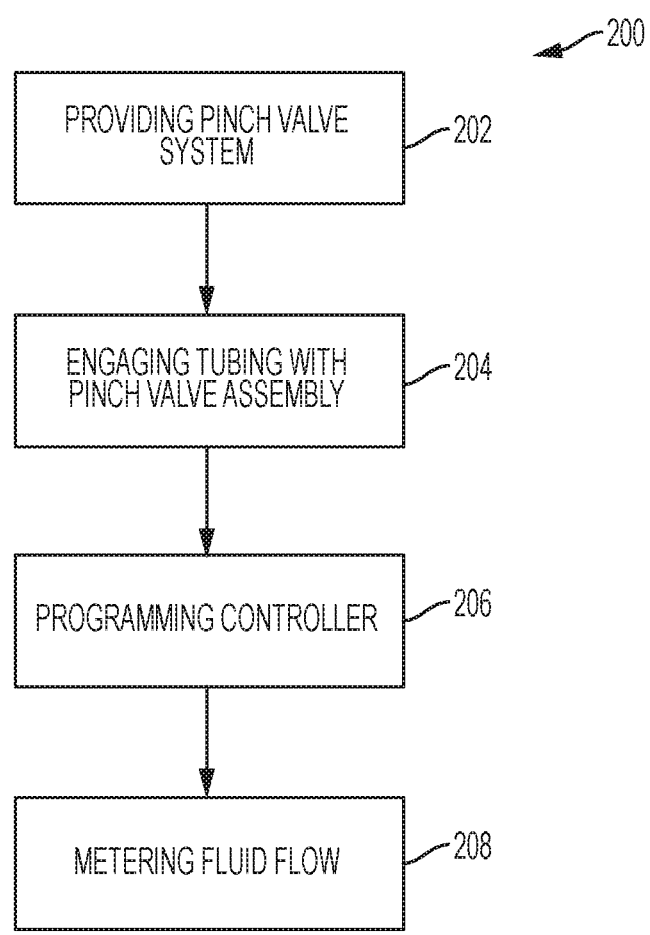
FIG. 13 depicts a flow chart of a method of operation for a pinch valve system according to one embodiment.

Referring to FIG. 13, a method 200 for operation of a pinch valve system 30 is disclosed. Step 202 can include providing a pinch valve system 30, which can include a pinch valve assembly 32, a controller 40, tubing 34, and/or any other suitable components (FIG. 1). Step 204 can include engaging the tubing 34 with the pinch valve assembly 32 such as, for example, by sliding the tubing 34 through the lateral portion 80 of the slotted aperture 36 until the tubing is substantially coaxial with the annular portion 78 (FIGS. 3 and 8). The tubing 34 can include a soft pliable tube having, for example an outer diameter of from about 0.125 inches to about 0.500 inches. It will be appreciate that any suitable type and configuration of tubing is contemplated. Step 206 can include programming the controller 40 to select a desired rate of flow within the tubing 34, where such programming can be entered by any client device, can be entered remotely, can be entered in accordance with pre-programmed specification, or the like. Step 206 can include transmitting the instructions from the controller 40 via a cable 32 to the actuator assembly 50, where the actuator assembly can include a stepper motor (FIG. 5).

Still referring to FIG. 13, a Method 200 can include Step 208 of metering fluid flow, where Step 208 can include energizing the actuator assembly 50 such that the leadscrew 52 can extend and correspondingly move the piston 58 towards the tubing 34 (FIG. 9). As the piston 58 contacts the tubing 34, the tubing 34 can begin to collapse or pinch between the ridge 90 (FIG. 5) of the piston 58 and the stationary dowel pin 62, where the dowel pin 62 can be positioned underneath the tubing 34, in one embodiment. As the piston 58 travels farther down the bore 70, the tubing 34 can become increasingly pinched, thus metering the fluid within the tubing 34 in accordance with the controller 40 programming. As shown in FIG. 10, the piston 58 can substantially or completely cut off fluid flow within the tubing 34 when fully extended.

Step 208 of metering the fluid flow can be controlled by the actuator assembly 50, which can include a stepper motor (FIG. 5), where the piston can travel in 0.0005 inch incremental linear steps, for example. Incremental linear steps can be about 0.001 inches, about 0.002 inches, 0.004 inches, from about 0.0005 to about 0.005 inches, or any other suitable distance. This can allow for extremely fine metering control of the fluid and/or gas passing through the tubing 34. The leadscrew 52 of the actuator assembly 50 can be designed to be non-back drivable such that if power is lost the fluid will be metered or controlled at the most recently designated level. Said differently, in one embodiment the piston 58 can be configured such that it only moves when energized. In such embodiments, electrical power may only be required to change piston 58 position relative to the valve body 60. Such a system can be considered "fail in place", which can be beneficial in remote applications where automated flow control is desired or in critical applications where flow must not be affected by system power failure.

Figure 14:
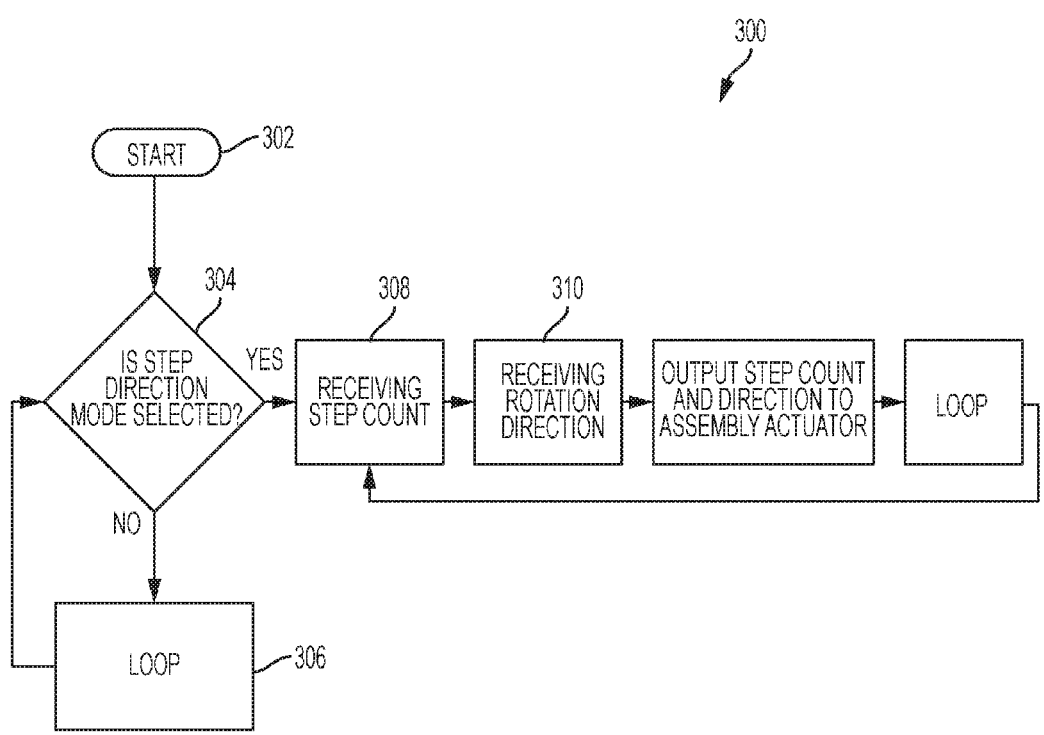
FIG. 14 depicts a flow chart of a method including a "Step and Direction" mode according to one embodiment.

Referring to FIG. 14, one embodiment of a method 300 for providing a "Step and Direction" mode of a pinch valve assembly 32 incorporating a stepper motor is shown. The method 300 can include a "Start" Step 302, where Step 302 can include initiating the controller 40 of the pinch valve assembly for use. Step 304 can include a query as to whether the "Step and Direction" mode is selected via the controller 40, where if the response to the query is "no" the method 300 can proceed to Step 306 and loop back to Step 304 until the "Step and Direction" mode is selected. Upon selecting the "Step and Direction" mode via the controller 40, the method 300 can proceed to Step 308, which can include the controller 40 receiving a step count, and Step 310, which can include the controller 40 receiving a direction of rotation. The controller 40 can receive or pre-programmed with such information from any suitable source as described in accordance with versions herein. The method 300 can proceed to Step 312, where the controller can output the step count and direction of rotation to the actuator assembly 50 such that the stepper motor actuates the leadscrew 52 the proper distance in the proper direction. It will be appreciated that any suitable stepper motor, such as the HAYDON KERK model G4 25000 series actuator, can be used in association with the pinch valve system 30. In one embodiment, in accordance with method 300, the controller 40 can be pre-programmed with the specifications of the specific stepper motor associated with the valve assembly 32. In this manner, the controller 40 can receive instructions regarding change in flow and the controller can output the appropriate step count and direction to the actuator assembly 50 associated with the desired flow change based upon the stepper motor specifications.

Figure 15:
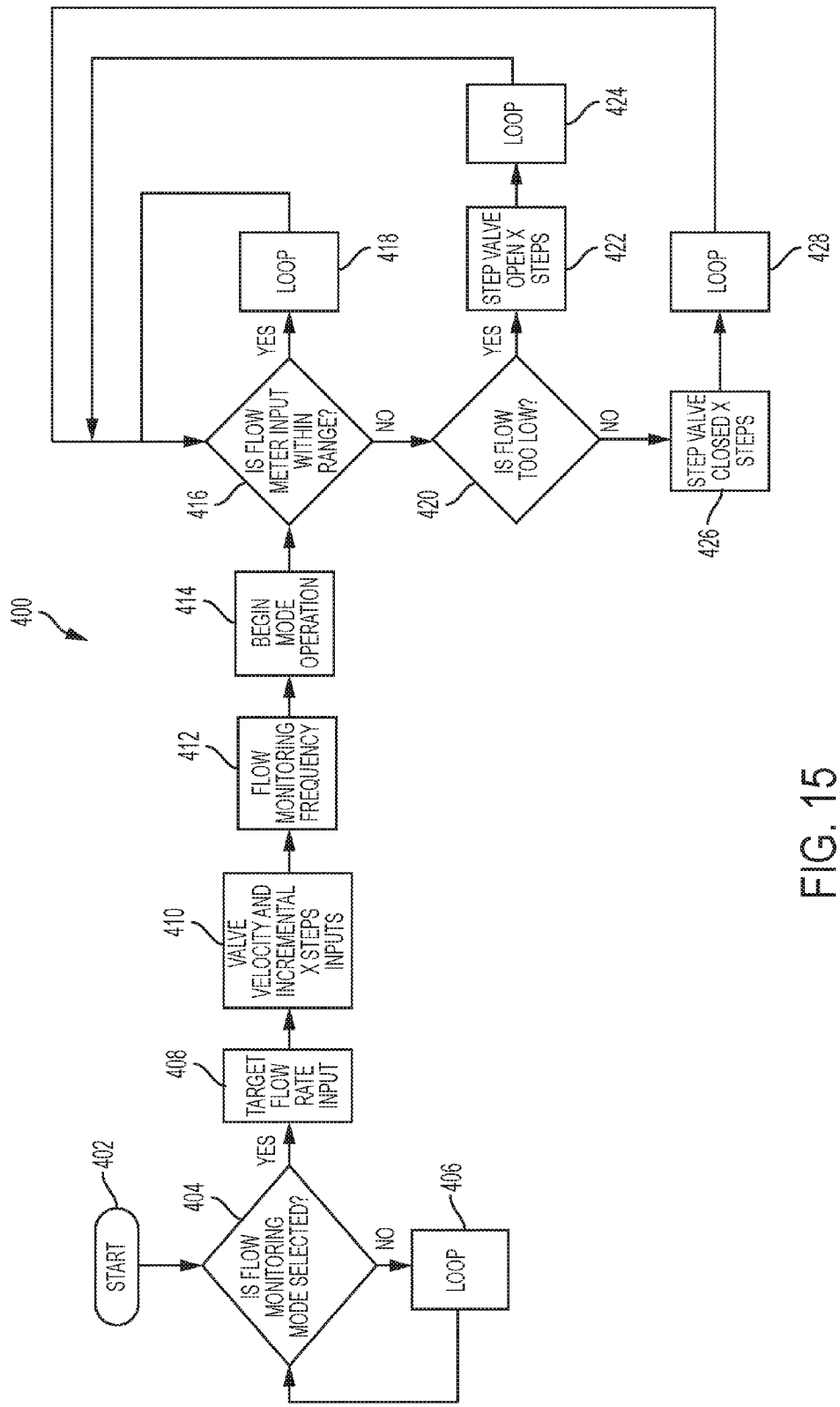
FIG. 15 depicts a flow chart of a method including a "Flow Monitoring" mode according to one embodiment.

Referring to FIG. 15, one embodiment of a method 400 for controlling a pinch valve assembly 32 based upon fluid flow is shown. The method 400 can include a "Start" Step 402, where Step 402 can include initiating the controller 40 of the pinch valve system 30 for use. Step 404 can include a query as to whether the "Flow Monitoring" mode is selected via the controller 40, where if the response to the query is "no" the method 400 can proceed to Step 406 and loop back to Step 404 until the "Flow Monitoring" mode is selected. Upon selecting the "Flow Monitoring" mode via the controller 40, the method 400 can proceed to set-up Step 408, which can include the controller 40 receiving a target flow rate input, Step 410, which can include the controller 40 receiving information on the valve velocity and incremental "X" steps inputs, and Step 412, which can include the controller 40 receiving a flow monitoring frequency. After completion of the set-up phase, the method 400 can proceed to Step 414, which can include the operational mode for the "Flow Monitoring" mode. During operation, Step 416 of the method 400 can include the controller 40 receiving flow data and comparing the flow data against the target flow rate. If the received flow data is within the target range the method 400 can proceed to Step 418 and continue to loop such that the flow is continually monitored.

If the received flow data is outside of the target range, the method 400 can proceed to Step 420 and ascertain if the flow is too low. If the flow is too low then the method 400 can proceed to Step 422, where the controller 40 can instruct the stepper motor of the actuator assembly 50 to open by a predetermined number of steps. The method 400 can, in accordance with Step 424, loop back to Step 416 and query whether the flow meter is now within the pre-determined target range. Referring back to Step 420, if the flow is not too low the method 400 can proceed to step 426, where the controller 40 can instruct the stepper motor of the actuator assembly 50 to close by a predetermined number of steps. The method 400 can, in accordance with Step 428, loop back to Step 416 and query whether the flow meter is now within the pre-determined target range.

It will be appreciated that the flow meter (not shown) associated with method 400 can be any suitable flow meter that can be associated with the tubing 34 or otherwise associated with the pinch valve system 30. The flow meter can communicate with the controller 40 via a cable (not shown) or wirelessly. In one embodiment, the controller 40 can receive flow input data from a flow meter via an analog input on the controller 40.

Figure 16:
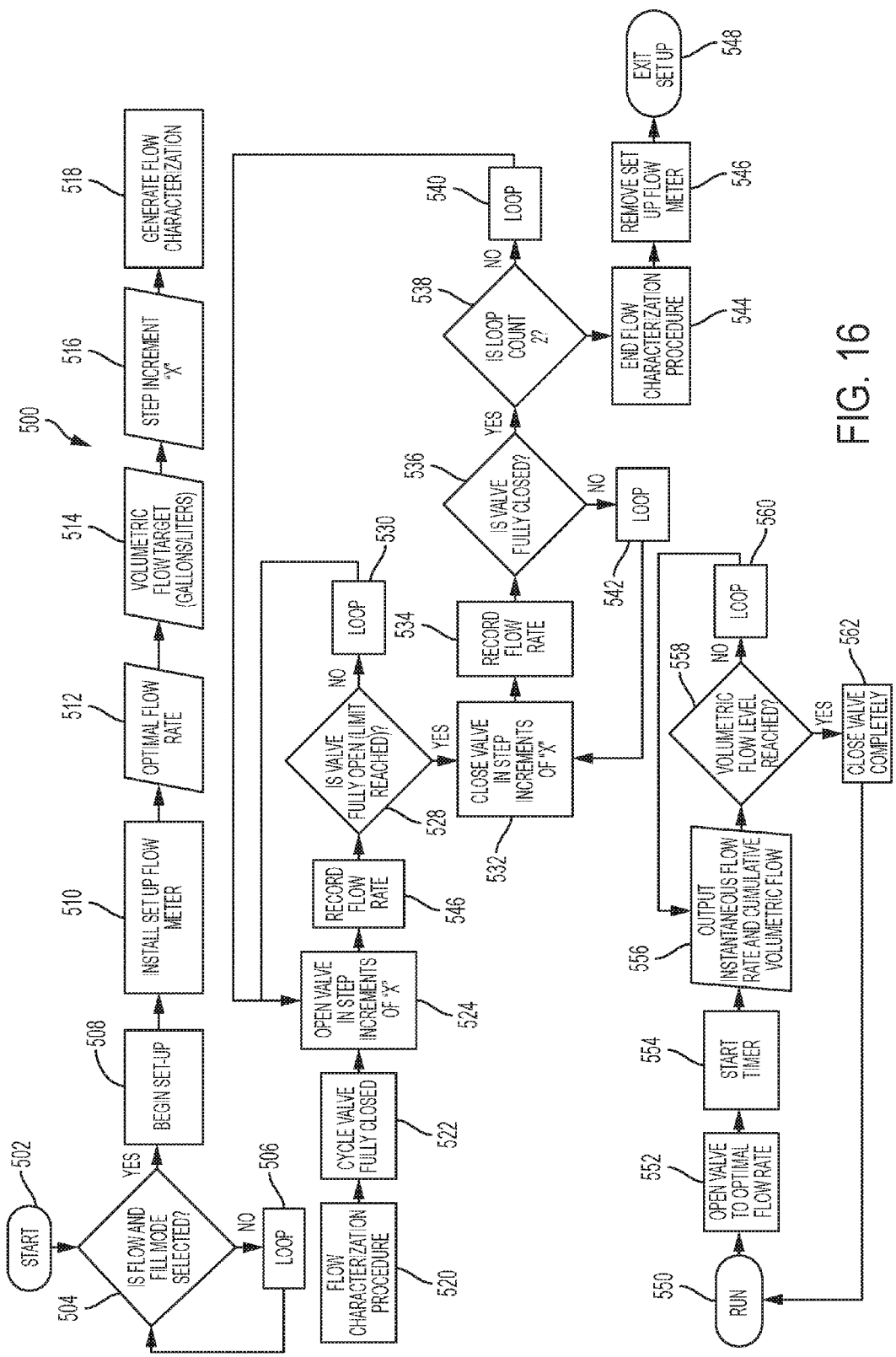
FIG. 16 depicts a flow chart of a method including a "Flow and Fill" mode according to one embodiment.

Referring to FIG. 16, one embodiment of a method 500 is shown where the pinch valve assembly 30 can be calibrated using a "Flow and Fill" mode. The method 500 can include a "Start" Step 502, where Step 502 can include initiating the controller 40 of the pinch valve assembly for use. Step 504 can include a query as to whether the "Flow and Fill" mode is selected via the controller 40, where if the response to the query is "no" the method 500 can proceed to Step 506 and loop back to Step 504 until the "Flow and Fill" mode is selected. Upon selecting the "Flow and Fill" mode via the controller 40, the method 500 can proceed to begin set-up Step 508, where the set-up phase can include Steps 508-518. Step 510 can include providing and installing a flow meter (not shown) upstream of the pinch valve assembly 32. Step 512 can include providing the controller 40 with an optimal instantaneous flow rate. Step 514 can include providing the controller 40 with a volumetric flow target or accumulative flow volume, where such a target can be in any measurement unit such as gallons, liters, or the like. Step 516 can include providing the controller 40 with information regarding the actuator assembly 50 and an associated stepper motor, where information regarding how much lateral movement is translated to the leadscrew 52 for each step of the stepper motor can be input. Based upon the information collected in set-up Steps 508-516, the method 500 can proceed to generate a flow characterization in accordance with Step 518.

Still referring to FIG. 16, the method 500 can include Steps 520-548 associated with establishing a flow characterization for a pinch valve system 30. It will be appreciated that, in one embodiment, the set-up Steps 508-516 have been completed in advance of proceeding to Step 520, but any suitable arrangement or order of steps in contemplated. Step 520 can begin the flow characterization procedure and the method 500 can proceed to Step 522, which can include cycling the piston 58 associated with the pinch valve assembly 32 to a fully "closed" position (e.g., FIG. 10) about a section of tubing 34. Step 524 can include the controller 40 communicating with the actuator assembly 50 such that the piston 58 is opened via a predetermined number of steps "X" of an associated stepper motor. Step 526 can include recording the flow rate through the tubing 34 when the piston 58 is partially opened as described in Step 524. Step 528 can include querying whether the piston 58 is in a fully "open" position (e.g., FIG. 8), where the controller 40 can determine if the piston 58 is in a fully open position, for example, with a home limit sensor 98 positioned on the actuator assembly 50. The home limit sensor 98 can be coupled to the controller with a cable 44 (FIG. 1), for example. If the piston 58 is not fully open, the method 500 can proceed to Step 530 and can loop back to Step 524. If the piston 58 is fully open the method 500 can proceed to Step 532 where the piston can be closed via a predetermined number of steps "X" of the associated stepper motor. After partially closing the piston 58 in accordance with Step 532 the method 500 can proceed to Step 534 where the flow rate is recorded through the associated tubing 34. The method 500 can then proceed to Step 536 and query whether the piston 58 has been fully closed, which can be determined by a position sensor 94 (FIG. 1) or any other suitable mechanism. If the piston has not been fully closed the method 500 can proceed to Step 542 and loop back to Step 532. In this manner, the method 500 can be used to measure and record the flow rate through the tubing 34 for pre-determined steps associated with the operation of the stepper motor. The controller 40, once programmed with the flow rates associated with each step, can accurately adjust the actuator assembly 50 during operating to insure that the optimal flow rate associated with Step 512 is achieved at all times.

Still referring to FIG. 16, the method 500 can include step 538 where the pinch valve assembly 32 can be evaluated through two or more full "open" and "closed" cycles to validate the flow rates associated with each position of the piston 58 and step of the stepper motor. After a predetermined number of such loops are achieved, the method 500 can proceed to Step 544 where the flow characterization phase can be terminated. Step 546 can include removing the flow meter and Step 548 can include exiting the set-up phase.

Referring to FIG. 16, the method 500 can include "run" Steps 550-562, where the "run" phase of method 500 can be used to fill a plurality of vessels (not shown) to a pre-determined volume using an optimal flow rate. In this manner, the pinch valve system 30 can be used to accurately and efficiently fill any suitable number of vessels or containers to any suitable volume. Step 550 can begin the "run" process and Step 552 can include opening the piston 58 to the optimal flow rate, where the optimal flow rate was input, for example, in Step 510 and the appropriate position of the piston 58 to achieve the optimal flow rate was determined during Steps 520-548, for example. The method 500 can then proceed to Step 554 where a timer (not shown) can be started and to Step 556 where information regarding flow rate and cumulative volumetric flow is output. Step 558 can include the controller 40 determining whether the volumetric flow level, which was input in accordance with Step 514, for example, has been reached. The volume can be calculated using the timer data and flow rate information output in accordance with Step 556. If the volumetric flow level has not been reached, the method 500 can proceed to Step 560 and loop back to Step 552. If the volumetric flow level target has been reached then the method 500 can proceed to Step 562 and can close the piston 58 completely (FIG. 10). The method 500 can then return to "run" Step 550 and repeat the run phase until a desired number of vessels or containers have been filled.

Figure 17:
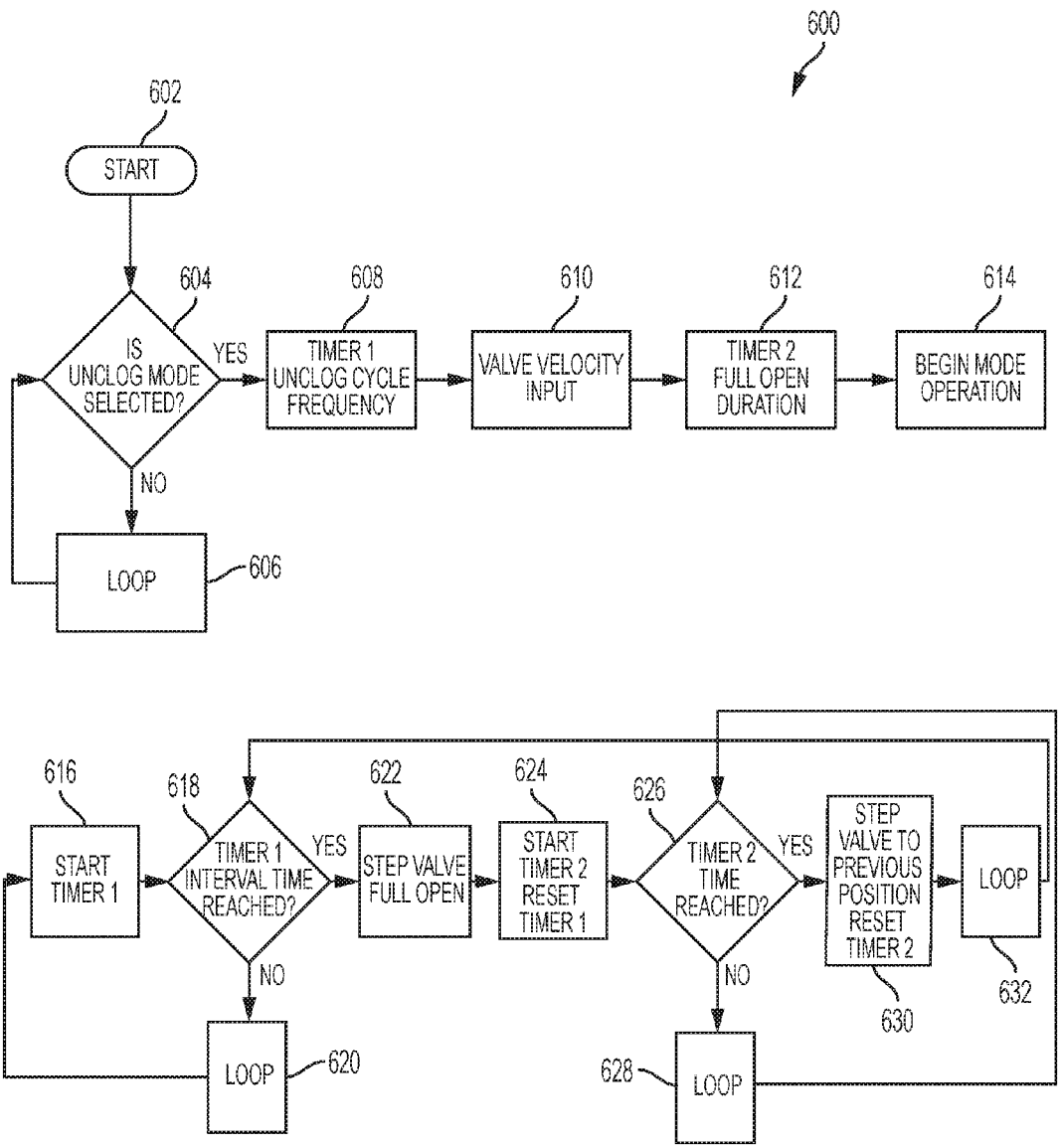
FIG. 17 depicts a flow chart of a method including an "Unclog" mode according to one embodiment.

FIG. 17 discloses one embodiment of a method 600 where the pinch valve system 30 can be used in an "Unclog" mode. This mode can be used with any of the other modes disclosed herein. Such a mode can allow the controller 40 to periodically cycle the piston 58 fully open, for example, to eliminate clogging of tubing 34 and then return the piston 58 to a set position. The "Unclog" mode may be beneficial when viscous slurry is flowing through tubing 34 and/or where a blockage could develop. The method 600 can include a "Start" Step 602, where Step 602 can include initiating the controller 40 of the pinch valve assembly 32 for use. Step 604 can include a query as to whether the "Unclog" mode is selected via the controller 40, where if the response to the query is "no" the method 600 can proceed to Step 606 and loop back to Step 604 until the "Unclog" mode is selected. Upon selecting the "Unclog" mode via the controller 40, the method 600 can proceed to set-up Steps 608-612. Step 608 can include providing a first timer associated with the controller 40 with a pre-determined frequency for running the "Unclog" cycle. Step 610 can include inputting the piston 58 velocity. Step 612 can include providing a second timer associated with the controller 40 with a desired time period for the piston 58 to remain fully open (e.g., FIG. 8). Upon completion of the set-up Steps 608-612 the method can proceed to Step 614 and begin the "Unclog" cycle.

Still referring to FIG. 17, the method 600 can include "run" Steps 616-632. Step 616 can include starting the first timer associated with the controller 40. Step 618 can include querying whether the timer has reached the pre-determined period input in accordance with Step 608. If the predetermined time period has not been reached the method 600 can proceed to Step 620 and loop back to Step 616. If the time interval of Step 608 has been reached then the method 600 can proceed to Step 622, which can include the controller 40 transitioning the piston 58 to a fully "open" position (e.g., FIG. 8). The method 500 can proceed to Step 624, which can include starting the second timer associated with Step 612. The method 600 can proceed to Step 626, which can include querying whether the pre-determined time interval associated with Step 612 has been reached. If the time interval has not been reached then the method 600 can proceed to Step 628 and loop back to Step 626. If the time interval has been reached then the method can proceed to Step 630, which can include resetting the position of the piston 58 to its prior position. The piston 58 can be transitioned to a position, for example, where it is maintaining the flow through tubing 34 at an optimal flow rate. The method 600 can proceed to Step 632 and loop back to Step 618 to determine if another "Unclog" cycle should be initiated. It will be appreciated that any suitable number of "Unclog" cycles are contemplated. It will be appreciated that any suitable movement and duration of movement associated with the piston can be associated with an "Unclog" cycle.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

I claim:

1. A pinch valve assembly comprising:
 a. a controller, wherein the controller is preprogrammed with a plurality of selectable modes including;
  i. a step and direction mode;
  ii. a flow monitoring mode;
  iii. a flow and fill mode; and
  iv. an unclog mode; and
 b. an actuator assembly, the actuator assembly being coupled to the controller such that the actuator assembly is controlled by the controller;
 c. an actuator, the actuator being actuated by the actuator assembly such that the actuator travels in a plurality of incremental steps in a first direction and a second direction in response to the plurality of selectable modes;
 d. a piston, the piston being coupled with the actuator such that relative movement of the actuator is transferred to the piston;
 e. a valve body, the valve body being coupled with the actuator assembly, wherein the piston travels in the first direction and the second direction within a bore defined by the valve body; and
 f. an aperture, the aperture being formed in the valve body, wherein the aperture is configured to retain at least a portion of tubing such that fluid or gas flow within the tubing can be metered.

2. The pinch valve assembly of claim 1, wherein the actuator is non-back drivable.

3. The pinch valve assembly of claim 1, wherein the plurality of incremental linear steps are 0.0005 inches in the first direction and the second direction.

4. The pinch valve assembly of claim 1, wherein the plurality of incremental linear steps are from 0.001 inches to 0.0005 inches in the first direction and the second direction.

5. The pinch valve assembly of claim 1, wherein the plurality of incremental linear steps are from 0.002 inches to 0.004 inches in the first direction and the second direction.

6. The pinch valve assembly of claim 1, wherein the plurality of incremental linear steps are from 0.005 inches to 0.0005 inches in the first direction and the second direction.

7. The pinch valve assembly of claim 1, wherein the piston is only moveable when the piston is energized.

8. The pinch valve assembly of claim 1, wherein the controller is operably configured to receive a step count and a direction of rotation in the step and direction mode.

9. The pinch valve assembly of claim 1, wherein the controller is operably configured to receive a target flow rate input and a flow monitoring frequency in the flow monitoring mode.

10. The pinch valve assembly of claim 1, wherein the controller is operably configured to receive an optimal instantaneous flow rate and a volumetric flow target in the flow and fill mode.

11. A pinch valve assembly comprising:
   a. a controller, wherein the controller is preprogrammed with a plurality of selectable modes selected from the group consisting a step and direction mode, a flow monitoring mode, a flow and fill mode, and an unclog mode;
   b. an actuator assembly, the actuator assembly being coupled to the controller such that actuator assembly is controlled by the controller;
   c. an actuator, the actuator being actuated by the actuator assembly such that the actuator travels in a plurality of incremental linear steps in a first direction and a second direction;
   d. a piston, the piston being coupled with the actuator such that relative movement of the actuator is transferred to the piston, wherein the piston includes a projection;
   e. a valve body, the valve body being coupled with the actuator assembly, wherein the piston travels in the first direction and the second direction within a bore defined by the valve body;
   f. a slotted aperture, the slotted aperture being formed in a lower portion of the valve body and having a slotted portion and a substantially annular portion, wherein the substantially annular portion is configured to retain tubing; and
   g. a dowel pin, the dowel pin being inserted into the valve body, wherein the projection of the piston and the dowel pin cooperate to pinch the tubing therebetween such that flow within the tubing can be metered by the controller in accordance with the plurality of selectable modes.

12. The pinch valve assembly of claim 11, wherein the plurality of incremental linear steps are 0.0005 inches to 0.002 inches in the first direction and the second direction.

13. The pinch valve assembly of claim 11, wherein the plurality of incremental linear steps are from 0.001 inches to 0.0005 inches in the first direction and the second direction.

14. The pinch valve assembly of claim 11, wherein the plurality of incremental linear steps are from 0.002 inches to 0.004 inches in the first direction and the second direction.

15. The pinch valve assembly of claim 11, wherein the plurality of incremental linear steps are from 0.005 inches to 0.0005 inches in the first direction and the second direction.

16. The pinch valve assembly of claim 11, wherein the piston is only moveable when the piston is energized.

17. The pinch valve assembly of claim 11, wherein the controller is operably configured to receive a step count and a direction of rotation in the step and direction mode.

18. The pinch valve assembly of claim 11, wherein the controller is operably configured to receive a target flow rate input and a flow monitoring frequency in the flow monitoring mode.

19. The pinch valve assembly of claim 11, wherein the controller is operably configured to receive an optimal instantaneous flow rate and a volumetric flow target in the flow and fill mode.

* * * * *